US011256848B2

(12) United States Patent
Salama (10) Patent No.: US 11,256,848 B2
(45) Date of Patent: Feb. 22, 2022

(54) AUTOMATED AUGMENTATION OF TEXT, WEB AND PHYSICAL ENVIRONMENTS USING MULTIMEDIA CONTENT

(71) Applicant: Ahmed Salama, Sydney (AU)

(72) Inventor: Ahmed Salama, Sydney (AU)

( * ) Notice: Subject to any disclaimer, the term of this patent is extended or adjusted under 35 U.S.C. 154(b) by 0 days.

(21) Appl. No.: 16/551,508

(22) Filed: Aug. 26, 2019

(65) Prior Publication Data

US 2020/0193081 A1    Jun. 18, 2020

Related U.S. Application Data

(63) Continuation of application No. 13/693,246, filed on Dec. 4, 2012, now abandoned.

(60) Provisional application No. 61/566,659, filed on Dec. 4, 2011.

(51) Int. Cl.
| | | |
|---|---|---|
| *G06F 40/103* | (2020.01) | |
| *G06F 16/93* | (2019.01) | |
| *G06F 16/9032* | (2019.01) | |
| *G06F 16/13* | (2019.01) | |

(52) U.S. Cl.
CPC .......... *G06F 40/103* (2020.01); *G06F 16/134* (2019.01); *G06F 16/9032* (2019.01); *G06F 16/94* (2019.01)

(58) Field of Classification Search
CPC ...... G06F 40/103; G06F 16/94; G06F 16/134; G06F 16/9032
See application file for complete search history.

(56) References Cited

U.S. PATENT DOCUMENTS

| | | |
|---|---|---|
| 6,904,560 B1 | 6/2005 | Panda |
| 9,275,079 B2 | 3/2016 | Nalawadi et al. |
| 9,418,136 B1* | 8/2016 | Gudmundsson ...... G06F 16/435 |
| 2003/0060240 A1 | 3/2003 | Graham et al. |
| 2007/0260986 A1 | 11/2007 | Cristofoli |
| 2008/0082497 A1 | 4/2008 | Leblang et al. |
| 2008/0086453 A1 | 4/2008 | Fabian |
| 2008/0162528 A1* | 7/2008 | Jariwala ................ G06F 40/169 |

(Continued)

OTHER PUBLICATIONS

Zhou et al., "Relevance feedback in image retrieval: A comprehensive review", 2003, Multimedia Systems 8: 536-544, Springer-Verlag, pp. 9 (Year: 2003).*

Liang et al., "Camera-based analysis of text and documents: a survey", 2005, International Journal on Document Analysis and Recognition (IJDAR), pp. 21 (Year: 2005).*

(Continued)

*Primary Examiner* — Chau T Nguyen
(74) *Attorney, Agent, or Firm* — Maschoff Brennan; Paul G. Johnson (57) ABSTRACT

Provided is an example method for automated augmentation of text, web and physical environments using multimedia content. The method may comprise determining that a user device displays a portion of the text document in a predetermined format, analyzing the portion of the text document to generate one or more keywords, generating, based on the one or more keywords, at least one search query for a multimedia content search via a search engine, retrieving, from one or more data storages, one or more pieces of multimedia associated with the one or more keywords, and enabling the user device to display the one or more pieces of multimedia concurrently with the portion of the text document, wherein the one or more pieces of multimedia are displayed on the user device according to predetermined user settings.

11 Claims, 10 Drawing Sheets

(56) References Cited

U.S. PATENT DOCUMENTS

| | | | |
|---|---|---|---|
| 2008/0309795 A1 | 12/2008 | Mitsuhashi et al. | |
| 2009/0235150 A1 | 9/2009 | Berry | |
| 2009/0285492 A1 | 11/2009 | Ramanujapuram et al. | |
| 2010/0215261 A1* | 8/2010 | Kim | G06K 9/4642 382/165 |
| 2011/0153653 A1* | 6/2011 | King | G06F 16/5846 707/769 |
| 2011/0179010 A1 | 7/2011 | Lin et al. | |
| 2011/0213655 A1 | 9/2011 | Henkin et al. | |
| 2012/0137237 A1* | 5/2012 | Brenner | G06F 16/7867 715/763 |
| 2012/0163707 A1 | 6/2012 | Baker et al. | |
| 2012/0179704 A1* | 7/2012 | Xu | G06F 16/40 707/766 |
| 2013/0021373 A1* | 1/2013 | Vaught | G06F 3/013 345/633 |
| 2013/0145241 A1 | 6/2013 | Salama | |
| 2015/0170333 A1 | 6/2015 | Jing et al. | |

OTHER PUBLICATIONS

Yeh, et al. "A Case for Query by Image and Text Content: Searching Computer Help using Screenshots and Keywords," Mar. 28-Apr. 1, 2011, International World Wide Web Conference Committee (IW3C2), ACM 978-I-4503-0632-4/11/03 10 pgs.

Final Office Action dated Feb. 25, 2019 in U.S. Appl. No. 13/693,246 25 pgs.

Office Action dated May 3, 2018 in U.S. Appl. No. 13/693,246 23 pgs.

Final Office Action dated Oct. 18, 2017 in U.S. Appl. No. 13/693,246 24 pgs.

Office Action dated Mar. 23, 2017 in U.S. Appl. No. 13/693,246 23 pgs.

Final Office Action dated Jan. 25, 2016 in U.S. Appl. No. 13/693,246 22 pgs.

Office Action dated Apr. 24, 2015 in U.S. Appl. No. 13/693,246 15 pgs.

* cited by examiner

AUTOMATED AUGMENTATION OF TEXT, WEB AND PHYSICAL ENVIRONMENTS USING MULTIMEDIA CONTENT

CROSS-REFERENCE TO RELATED APPLICATIONS

This application is a continuation of U.S. patent application Ser. No. 13/693,246, filed Dec. 4, 2012, titled AUTOMATED AUGMENTATION OF TEXT, WEB AND PHYSICAL ENVIRONMENTS USING MULTIMEDIA CONTENT, which claims priority to U.S. Provisional Application No. 61/566,659, filed Dec. 4, 2011, titled AUTOMATED AUGMENTATION OF TEXT, WEB AND PHYSICAL ENVIRONMENTS USING MULTIMEDIA CONTENT, all of which are incorporated herein by reference in their entireties.

FIELD

This disclosure relates generally to data processing and, more particularly, to methods and systems for automated augmentation of text, web and physical environments using multimedia content.

BACKGROUND

With the advent and rapid spread of electronic book (e-book) readers, tablet personal computers (PCs) and other hand-held devices, e-books are becoming very popular and the number of available e-books is steadily growing. The devices that can be used to view e-books and other textual content, such as websites utilize various formats, which are not limited to plain text and can also be used to display multimedia content, such as videos and images. However, e-books and web content, such as blogs are often insufficiently or poorly illustrated. Because illustrations promote better understanding of the contents, users may be forced to search the web for illustrations. This may be time-consuming and inconvenient.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are methods and systems for automated augmentation of text, web and physical environments using multimedia content. In some example embodiments, a method for automated augmentation of text, web and physical environments using multimedia content comprises determining that a user device displays a portion of the text document in a predetermined format, analyzing the portion of the text document to generate keywords, generating, based on keywords, at least one search query for a multimedia content search via a search engine, retrieving, from one or more data storages, one or more pieces of multimedia associated with one or more keywords, and enabling the user device to display the one or more pieces of multimedia concurrently with the portion of the text document, wherein the pieces of multimedia are displayed on the user device according to predetermined user settings.

In some example embodiments, analyzing the portion of the text document to generate the keywords comprises parsing the portion of the text document to generate a plurality of terms and generating keywords based on the plurality of terms. In some example embodiments, generating the keywords comprises selecting the plurality of terms, which appear in the portion of the text document more than a predetermined number of times.

In some example embodiments, keywords may be generated based on contextual data occurring in a displayed portion of a text, such as, for example, a date, a location, or a name. In some example embodiments, the keywords may be generated based on those terms in the displayed portion of the text that start with an uppercase letter.

In some example embodiments, the method may further comprise applying an optical character recognition process to an image containing a text to retrieve the plurality of terms. In some example embodiments, the predetermined format of the text document may include an e-book reader text format or a web page document format. In some example embodiments, a portion of the text document is related to a virtual page of an e-book.

In some example embodiments, the multimedia content may comprise a text, a still image, an icon, an animated image, a video, and an audio. In some example embodiments, the pieces of multimedia are displayed on the user device as a mosaic. In some example embodiments, data storages are selected from a remote database, a web site, a local database, or a cache of the user device. In some example embodiments, the search engine is selected from a third party image search engine, a web search engine, or a local search engine embedded within the user device. In some example embodiments, the method may further comprise storing the pieces of multimedia associated with the keywords to local or remote data storage.

In some example embodiments, the method may further comprise generating unique identifiers associated with each piece of multimedia from the set of pieces of multimedia and corresponding keywords, wherein the unique identifiers are stored in the local or the remote data storage along with corresponding pieces of multimedia and the corresponding keywords.

In some example embodiments, the predetermined user settings define a number of displayable pieces of multimedia per a portion of the text document, a number of the displayable pieces of multimedia per a slideshow, types of the displayable pieces of multimedia, a size of the user device screen allocated for displaying the pieces of multimedia, a number of slideshows, and a grid style used for arrangement of multiple pieces of multimedia on the user device screen using a dynamic layout program.

In some example embodiments, the method may further comprise enabling a user device to capture an image for further displaying, wherein the captured image at least in part relates to the portion of the text document. In some example embodiments, pieces of multimedia are displayed dynamically depending on a currently displayable portion of the text document.

In some example embodiments, a web-based data storage with publicly available multimedia content may be used by the technology described herein to source multimedia content. Images, videos, and other multimedia content may be used. Such multimedia content or electronic links thereto may be added by the users manually to their profiles. The latter may enable sourcing multimedia content using the proposed method with greater relevance.

In some example embodiments, multimedia content may be added to e-books and other displayable text documents using the method proposed herein during the design stage, i.e. the related multimedia content may be embedded prior to their publication. The user may be able to select to display or hide the embedded multimedia content.

In some example embodiments, the displayed relevant multimedia content may be clicked to display the corresponding caption or some related information.

In further exemplary embodiments, modules, subsystems, or devices may be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In accordance with various embodiments and the corresponding disclosure thereof, a computer-implemented methods and systems for automated augmentation of text, web and physical environments using multimedia content are provided. The disclosed methods and systems provide a unique way to improve experience of reading text-only content such as e-books or text based web sites by adding visual supplemented contented associated with a text.

The methods disclosed herein may be implemented in various types of electronic user devices including portable e-book readers, tablet PCs, laptops, mobile and smart phones, personal digital assistants (PDAs), computers, and any other electronic devices configured to display digital content and interact with remote servers via a network such as the Internet.

In some example embodiments, the user devices may merely embed a web browser allowing users to browse web sites through the Internet and virtually interact with a remote system for automated augmentation of text, web and physical environments using multimedia content. In this case, when a user opens, for example, a text-only web page, the system for automated augmentation of text, web and physical environments may automatically enable a user device to display a text of a web site and corresponding images or video content concurrently on the same screen.

In some embodiments, the user device may embed software allowing adding multimedia content to text, web and physical environments without the necessity of interacting with any remote systems. In this case, the user device may include an internal data storage providing multimedia content when users read text documents. In some additional and alternative embodiments, there may be provided hybrid systems such that the user device may embed software, which may allow adding multimedia content to text, web and physical environments with or without interaction with remote systems.

According to various example embodiments, once the user device is requested to display a text only document of any kind or a document or web page having a dominant text part, either software installed in the user device or in a remote server causes the user device to display both the text part and multimedia content simultaneously. The multimedia content may relate to a still image, an icon, an animated image, a video and an audio, or any combination thereof. In some example embodiments, the multimedia content comprises multiple images or video (audio-video), which may be displayed sequentially, i.e. as a slideshow, or simultaneously, as a mosaic, a grid-based layout, or in any combination thereof.

In some example embodiments, a transparent image, such as 24 bit transparent Alpha Portable Network Graphics (PNG) or a shadow may be used to overlay the pictures to simulate an illusion of depth. This approach may be applied to all images to make them appear in theme and aesthetically pleasing.

In some example embodiments, a video may be cropped and its size adjusted to fit within a designed grid-based layout of a displayable page. For example, a horizontal landscape video may be cropped so that it may fit within a vertical page, or within a square on the page. A video may be automatically played when a user lands on a page, or automatically stopped when a user moves on to a different page, whilst retaining a time position of the video, so that when the user comes back to that page, the video continues playing where it left off. The video may also contain volume functions overplayed graphically so that the user may adjust the volume of a video clip. The video may be played back in a looped fashion so that the video keeps repeating infinitely without the need for replay. Formats used for videos and motion may include animated gifs, compressed video, vector animation, or any other video formats.

Multimedia content may be retrieved either from a user device memory (e.g., a local data store or a database) or from a remote server. A process for retrieving multimedia content may involve an analysis of the text currently displayable on the user device. For example, a currently displayable page of an e-book may be analyzed. As a result of the text analysis, a number of terms may be generated. Such terms may relate to words (e.g., nouns), phrases, or sentences. Further, the terms may be used to generate keywords. To this end, it may be determined what terms appear more frequently in the text, and those terms are used to construe keywords. Those skilled in the art would appreciate that various methods for generating keywords may be utilized.

Once the keywords for a portion of the displayable text content are generated, search queries may be formulated. Such search queries may be then used in a local database or a remote search engine to find and retrieve multimedia content associated with the keywords. When the multimedia content is retrieved from remote servers, it may be locally stored on the user device to enable faster access in the following cases. Once multimedia content is retrieved, it may be displayed on a user device screen along with a corresponding text portion. For example, software used for visualization of text portions may include widgets to embed multimedia content. In some other examples, a part of the user device screen may be virtually allocated for displaying the multimedia content. It should be understood, that there exist other ways of displaying text content and multimedia content.

In some example embodiments, keyword extraction and accompanying multimedia search results may yield inaccurate results. Therefore, a user may have an option of deleting an image or a video, which appears to be irrelevant. When the user deletes an image, the next best fitting search result may replace the deleted image. The user may repeat the deletion process until he selects an appropriate image. The selected image may be saved so when a similar query is performed it yields more accurate results. Such intelligent learning may be employed to provide better accuracy for image results.

In some example embodiments, the user may assign custom images from search results to particular keywords in a book or a text. These assignments may be stored to a central database, which may be shared with other users, so that that the users have a better experience with their own books. User devices may be configured to check the central database each time a page or an eBook is loaded with new keyword data or multimedia content, which would help improving user experience with the page.

In some example embodiments, if there are not enough images to fill up the entire grid-based layout on the displayable page, the unused grid spaces may be filled up with placeholder images, which may be include solid colors, or randomly selected placeholder images from a database of placeholder images. This is to provide an aesthetically pleasing layout even if there are not enough images to populate the entire page.

In some example embodiments, in order to lay out multiple images on a displayable page automatically, a different grid-based layout may be randomly generated for each displayable page. This may be done in two different ways. The first is when each page includes image containers whose size may be randomly generated, forming a mosaic of squares including images and solid colors. The second is when preprogrammed templates are stored on the user device or on a remote server providing a layout for an image mosaic.

In yet more embodiments, the user device may display a text document in the form of an image. For example, the user device may have a digital camera, which may be used to capture some printed text documents. Once such image containing a text is displayed on the user device screen, the image may be subjected to an optical character recognition process to derive terms used therein. These terms may then be used to generate keywords and search queries.

In some example embodiments, multimedia content may be added to the first occurrence, or all occurrences of a term in the displayed portion of the text, whichever option may be selected by the user. If the user wishes the multimedia content to be added to all occurrences of the term in the displayed portion of the text, he or she may specify that a different image or video is added to each occurrence of the term.

In some example embodiments, the methods described herein may be utilized within a tablet device environment. A tablet device may embed both e-books and web pages and may also be used as a reader for blogs, articles, and other online and offline documents.

In some example embodiments, in addition to displaying relevant multimedia content, hyperlinks to relevant resources on the Internet may be provided within the text. Images, videos, and keywords may be linked to their sources. Links may be presented by placing a button over the image, which may reveal the link or opens up a URL associated with the link.

In some example embodiments, prepackaged eBooks may come bundled with accompanying multimedia content and layouts so that no analysis or multimedia content search is required when viewing the eBook. This prepackaged eBook may be downloaded from a remote server or transferred via a disk drive or the Internet. The prepackaged eBook may include image files, video files, template files, graphic files, text files, eBook files, and any other files applicable to view the eBook in an offline mode (e.g., having no connection to a WAN).

It should be understood that methods to conduct searches for relevant multimedia content are not limited to the methods described herein, which are provided merely as examples. Other example search methods may be used.

In some example embodiments, if a single sentence within a portion of the displayed text contains multiple occurrences of contextual data, such as, for example, a location, a date, and a name, the entire sentence may be used for performing a semantic search for relevant multimedia content.

In some example embodiments, multimedia content may be added to user-generated presentations and essays. Images and videos may be added instantly using a predetermined template or layout as the user types a word that may be used for generating a keyword in accordance with the embodiments described herein. Keywords may also be predefined by the user, stored in the keywords database, and used to conduct searches for multimedia content when reproduced by the user in the text of a presentation or essay. This approach may be facilitated by software integrated within a word processor, e.g. Microsoft Word, as a plug-in or used as a standalone application.

In some embodiments, portions of the text to which multimedia content has been added or individual images or videos may be shared via a social network. For example, this may be done by highlighting an image or quote to be shared and pressing a "share" button.

Accordingly, there are disclosed unique computer-implemented methods for adding multimedia content to displayable text, web and physical environments. The operations of such methods may be implemented by software modules integrated with a user device, a remote server or a combination thereof. The present techniques provide a useful means for improving overall experience of enjoying reading books or text only documents.

Figure 1:
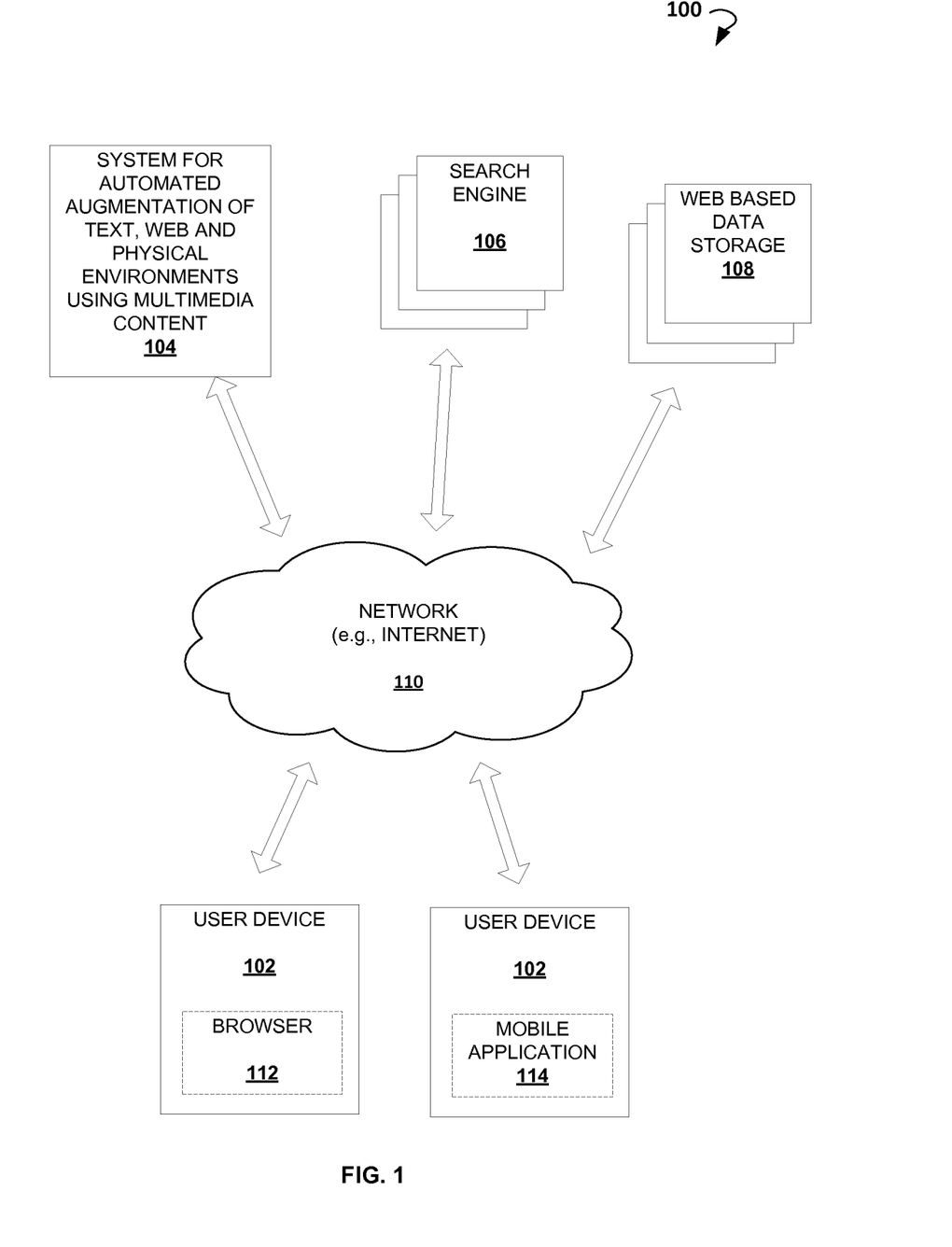
FIG. 1 shows a block diagram illustrating a system environment suitable for automated augmentation of text, web and physical environments using multimedia content, in accordance with certain embodiments.

Referring now to the drawings, FIG. 1 shows a block diagram illustrating a system environment 100 suitable for adding multimedia content to displayable text, web and physical environments. The system environment 100 may comprise a user device 102 with a browser 112, which may provide the ability to browse the Internet and interact with various websites, e.g. web search engine 106. A user device may include a computer or a laptop. In some embodiments, the user device 102 may be a mobile device that includes a mobile application 114. A mobile device may include a tablet computer, a handheld cellular phone, a mobile phone, a smart phone, a PDA, a handheld device having wireless connection capability, or any other electronic device. The system environment 100 may further include a system for adding multimedia content to displayable text, web and physical environments 104, a search engine 106, including a web search engine, such as Google or Bing, a third-party image search engine, or a local search engine embedded within the user device, a web-based data storage 108 that allows storing and retrieving the digital media content, and a network (e.g. the Internet) 110.

The network 110 may couple the aforementioned modules and is a network of data processing nodes interconnected for the purpose of data communication that may be utilized to communicatively couple various components of the system environment 100. The network 110 may include the Internet or any other network capable of communicating data between devices.

The network 110 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 may include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 may be represented using technologies or formats including image data in binary form (e.g. Portable Network Graphics (PNG), the hypertext markup language (HTML), the extensible markup language (XML), etc. In addition, all or some links may be encrypted using conventional encryption technologies such as secure sockets layer (SSL), transport layer security (TLS), virtual private networks (VPNs), Internet Protocol security (IPsec), etc. In some embodiments, the entities on the network 110 may use custom or dedicated data communications technologies instead of, or in addition to, the ones described above.

The user device 102 may include a computer, a laptop, a tablet computer, a portable computing device, a PDA, a handheld cellular phone, a mobile phone, a smart phone, a handheld device having a wireless connection capability, or any other electronic device. In various embodiments, the user device 102 may comprise a browser that provides the ability to browse the Internet. The user device 102 may be used to communicate with the search engine 106. Accordingly, the user device 102 may receive or transmit data, such as search queries, via a wired or a wireless network.

The system for adding multimedia content to displayable text, web and physical environments 104, according to exemplary embodiments disclosed herein, may be used for adding multimedia content to the displayable text, web and physical environments by interacting with the search engine 106 and the web-based data storage 108, which may provide multimedia content as users read text documents. More specifically, the system for adding multimedia content to text, web and physical environments 104 may analyze the portion of the text displayed using the user device 102, generate keywords based on the more frequently occurring terms (e.g., nouns), phrases, or sentences, generate search queries based on these keywords, and send them to the search engine 106.

In some embodiments, the search engine 106 may conduct a search for multimedia content and store the multimedia content in the web-based data storage 108. In some embodiments, the user device 102 and the system for adding multimedia content to displayable text, web and physical environments 104 may interact with the web-based data storage 108 to retrieve the multimedia content, which may then be displayed on the user device screen by the system for adding multimedia content to displayable text, web physical environments 104 as embedded in the portion of the text displayed, or in a separate portion or portions of the user device screen (not shown).

In some example embodiments, the system environment 100 may comprise an intermediary server (not shown). The intermediary server may be configured to manage and parse all search queries from the user device and manage image resizing, image fetching, image searches, keyword extraction, account management, account details storage, template storage, template generation, uploading of templates and user generated data, and so forth. The intermediary server may be also configured to provide updates to eBook templates on the user device.

Figure 2:
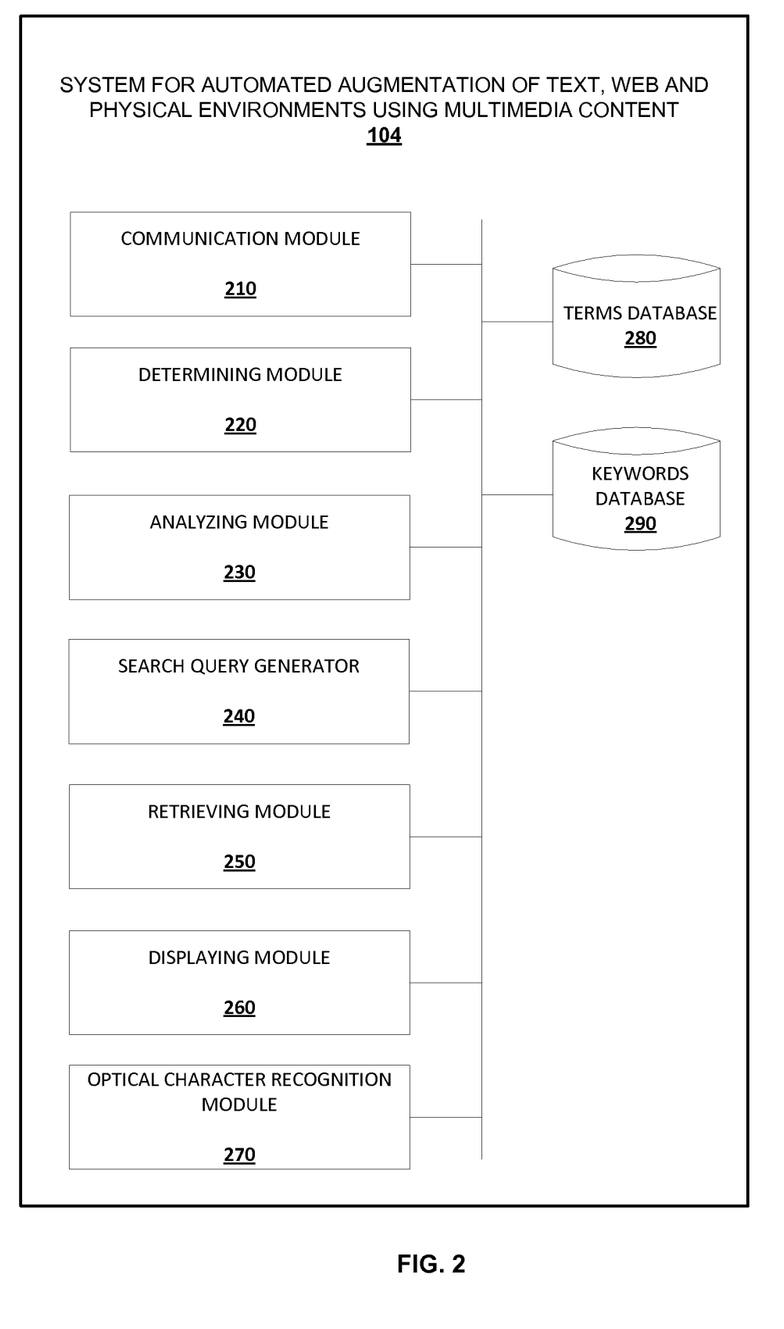
FIG. 2 is a diagram of a system for automated augmentation of text, web and physical environments using multimedia content, in accordance with certain embodiments.

FIG. 2 is a block diagram of the system for adding multimedia content to text, web and physical environments 104. In the shown embodiment, the system for adding multimedia content to text, web and physical environments 104 may comprise a communication module 210, a determining module 220, an analyzing module 230, a search query generator 240, a retrieving module 250, a displaying module 260, an optical character recognition module 270, a terms database 280, and a keywords database 290.

The communication module 210 may be configured to provide user interactions with the system for adding multimedia content to displayable text, web and physical environments 104, as well as to provide interaction between the different modules of this system. The determining module 220 may be configured to determine which of the terms may be used as keywords, to generate such keywords and to store the keywords in the keywords database 290.

The analyzing module 230 may be configured to analyze the portion of the text displayed in order to identify terms (e.g. nouns), phrases, and sentences, thereby enabling their further use as keywords. The analyzing module 230 may be configured to analyze dates mentioned in the portion of the text displayed or the in the entire article/book to establish a time context for the images being sought. The search query generator 240 may be configured to convert into search query keywords, formulated based on the terms, selected by the analyzing and determining modules 230, 220 and stored in the keywords database 290.

Figure 3:
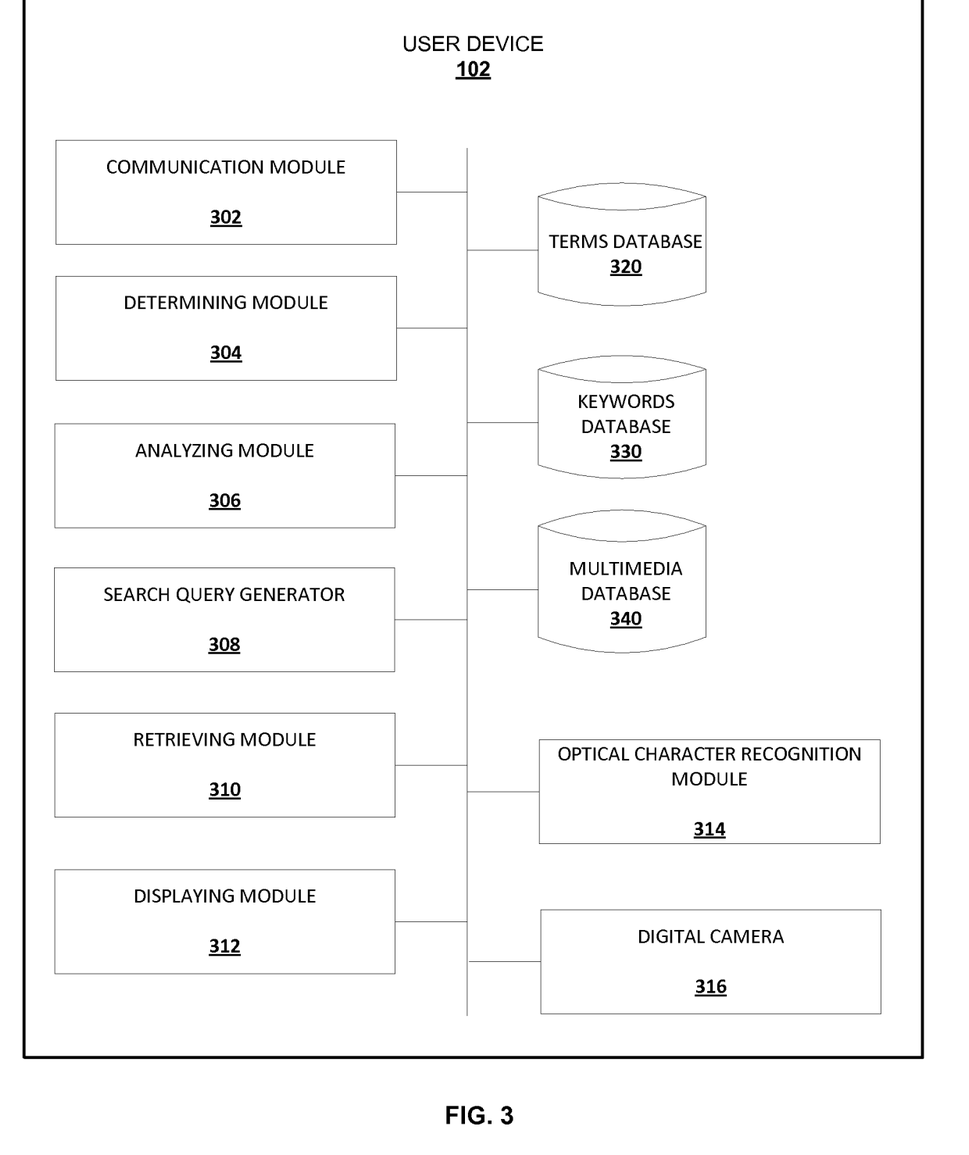
FIG. 3 shows a user device with an embedded system for automated augmentation of text, web and physical environments using multimedia content, in accordance with certain embodiments.

The retrieving module 250 may be configured, in some embodiments, to retrieve multimedia content from the web-based data storage 108, while in some other embodiments, the retrieving module 250 may be configured to retrieve multimedia content from the multimedia content database 340 shown in FIG. 3.

The displaying module 260 may be configured to display multimedia content retrieved by the retrieving module 250. The optical character recognition module 270 may be configured to scan a portion of a printed text document into an image containing a text to be processed by the analyzing module 230 and the determining module 220.

The terms database 280 may be configured to store the terms that were identified in the displayed portion of the text by the analyzing module 230 and suitable to be used as keywords by the determining module 220. The keywords database 290 may be configured to store keywords, formulated based on the terms that were selected by the analyzing module 230 and the determining module 220.

FIG. 3 is a block diagram of the user device 102 with the system for adding multimedia content to displayable text, web and physical environments. In some embodiments, specifically when a printed text document is used, the optical character recognition module 314 may be used to scan the printed text document into an image containing text, and the image with the text is further subjected to optical character recognition to generate one or more keywords. To this end, the user device 102 may also comprise a digital camera 316 to capture the displayed portion of the text.

In some example embodiments, the digital camera may be attached to a head-mountable display device, such as a heads-up display. For example, a person wearing the head-mountable display device with an in-built camera may view the surroundings and by means of the camera and computer device may scan the environment such as advertisements, signs, billboards, magazines, and newspapers for text. The scanned material may be further processed by the computer device to generate keywords and provide relevant real-time images and other multimedia on the heads-up display.

Interaction with the system for adding multimedia content to displayable text, web and physical environments 104 may be performed using the communication module 302. The analyzing module 306 may analyze the portion of the text displayed to identify those terms (e.g. noun), phrases, or sentences, which occur in this portion of the text more frequently. The determining module 304 may then determine which of the found terms may be used as keywords, generating such keywords and storing them in the keywords database 290. The identified terms may be stored in the terms database 320 and the keywords generated based on the identified terms may be stored in the keywords database 330.

The search query generator 308 may convert the stored keywords into search queries, which may be sent to the search engine 106. In some embodiments, these search queries may be used to search for multimedia content in the multimedia content database 340.

In some embodiments, the retrieving module 310 may interact with the web-based data storage 108 to retrieve the stored multimedia content. In other embodiments, the retrieving module 310 may retrieve multimedia content from the multimedia content database 340. The retrieved multimedia content is then visualized by the displaying module 312.

Figure 4:
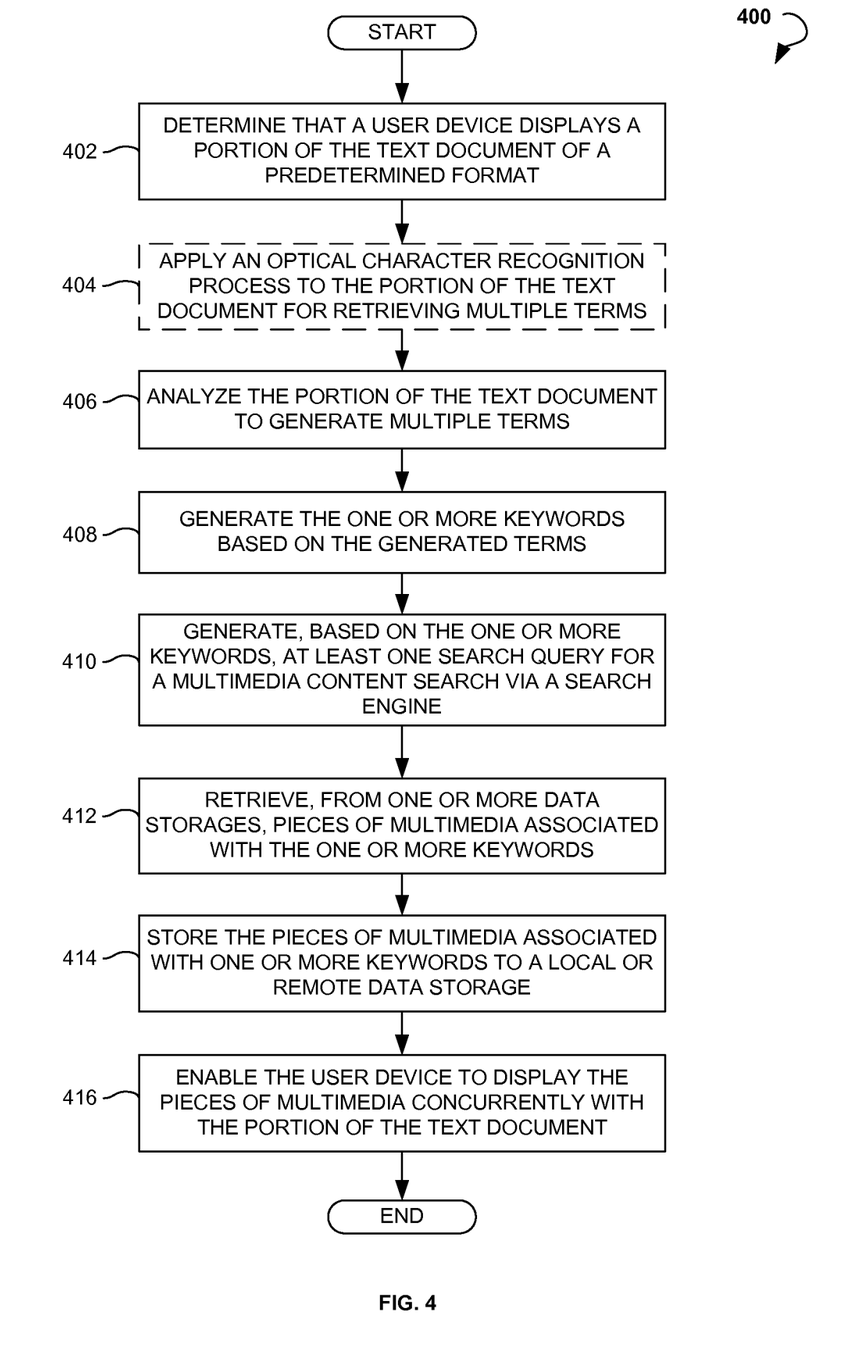
FIG. 4 is a process flow diagram showing a method for automated augmentation of text, web and physical environments using multimedia content, in accordance with certain embodiments.

FIG. 4 is a process flow diagram showing a method 400 for adding multimedia content to displayable text, web and physical environments, according to an exemplary embodiment. The method 400 may be performed by processing logic that may comprise hardware, software (such as software run on a general-purpose computer system or a hand-held device), or a combination of both.

The method 400 may be applied using the various modules discussed above with reference to FIG. 3. Each of these modules may include processing logic. It will be appreciated that the examples of the foregoing modules may be virtual, and the instructions said to be executed by a module may, in fact, be retrieved and executed by a processor. The foregoing modules may also include memory cards, servers, and/or computer discs. Although the various modules may be configured to perform some or all of the various steps described herein, fewer or more modules may be provided and still fall within the scope of the exemplary embodiments.

As shown in FIG. 4, the method 400 may commence at operation 402 with determining that a user device displays a portion of a text document of a predetermined format. In some embodiments, if the text is a printed text document and a digital camera is used to capture it, the text may be subjected to an optical recognition process that may commence at operation 404.

At operation 406 the portion of the text displayed may be analyzed by the analyzing module 230 to identify the terms (e.g. nouns), phrases, and sentences. The determining module 220 may then determine which of the found terms may be used for generating keywords and may then generate keywords based on these terms at operation 408. At operation 410, the search query generator 240 may be used to generate at least one search query, which may then be sent to the search engine 106.

In some example embodiments, the displayed text content may be transmitted to a server for processing. The processing of the text to generate keywords and the sourcing of images may take place on a remote web server (in the cloud), and the server may transmit back to the user device a combination of both text and images, either packaged together or as separately, so that the user device can display the text and accompanying images without having to conduct the search queries or the keyword generation locally. Thus, the determining module 220 may rely on cloud-based keyword identification and extraction as well as cloud based image retrieval.

At operation 412, the retrieving module may retrieve the multimedia content, associated with one or more keywords, from the search engine 106 and store the one or more keywords in local or remote data storage at operation 414. At operation 416, the displaying module displays the stored multimedia content concurrently with the corresponding portion of the text on the user device screen.

Figure 5:
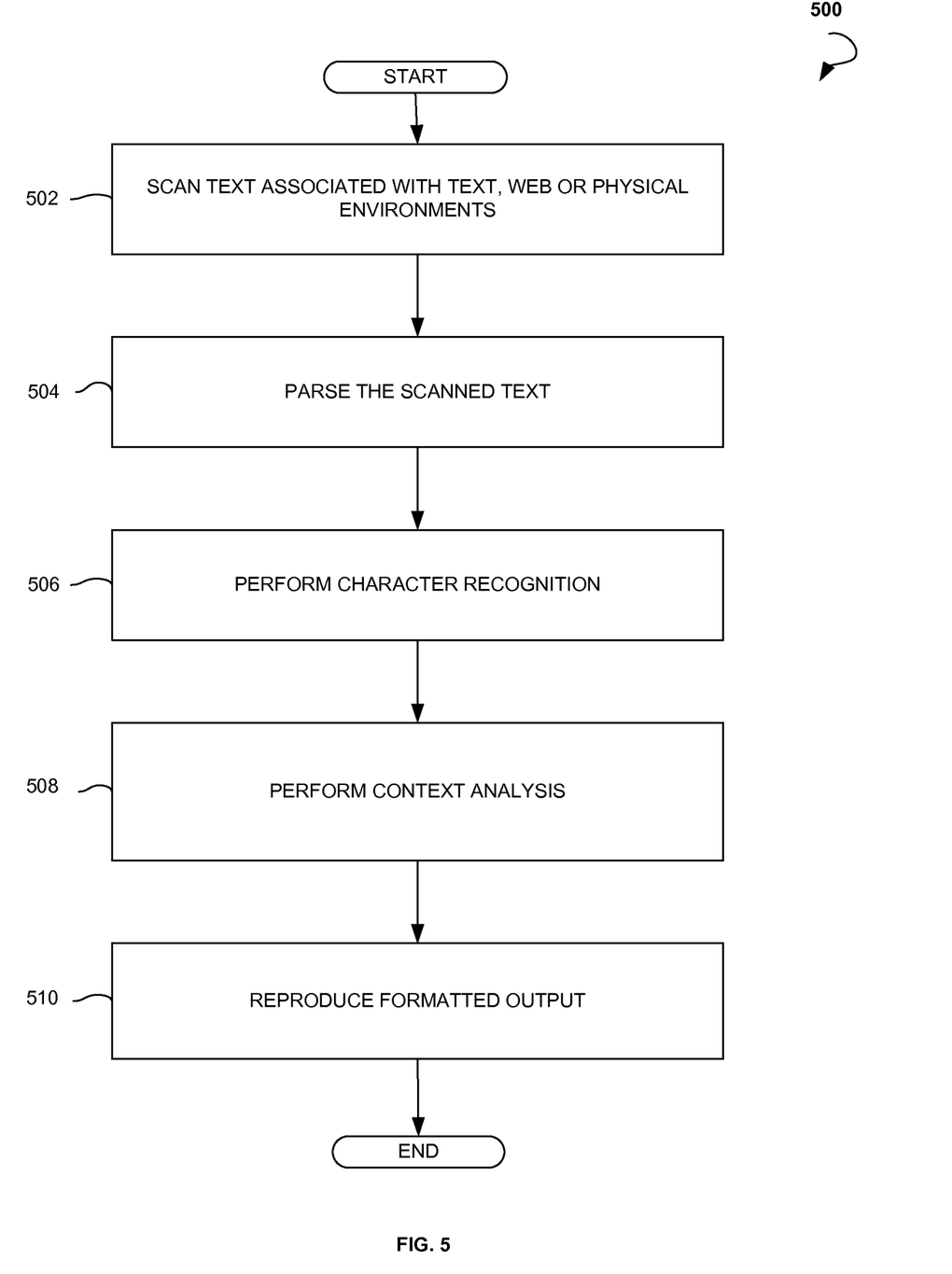
FIG. 5 is a process flow diagram showing a method for optical character recognition of a text from text, web, and physical environments, in accordance with certain embodiments.

FIG. 5 is a process flow diagram showing a method 500 for optical character recognition of a text from text, web and physical environments, according to an example embodiment. As shown in FIG. 5, the method 500 may commence in operation 502 with scanning text associated text, web and physical environments. In one example embodiment, text, web, and physical environments may be scanned using a head-mountable display device with a built-in digital camera or a tablet device. In operation 504, the scanned text may be parsed. During the parsing, the scanned text may be analyzed to separate the text from graphics and to detect presence of columns and headlines. After the text is parsed, the shapes of individual characters are recognized via a character recognition process, in operation 506. Character recognition may be performed on any number of character fonts. In operation 508, context analysis may be performed to divide the text into words. Finally, the recognized characters may be formatted for output, in operation 510. After the optical character recognition is performed, the text may be electronically searched for keywords to retrieve, from data storages, pieces of multimedia associated with the one or more keywords.

Figure 6:
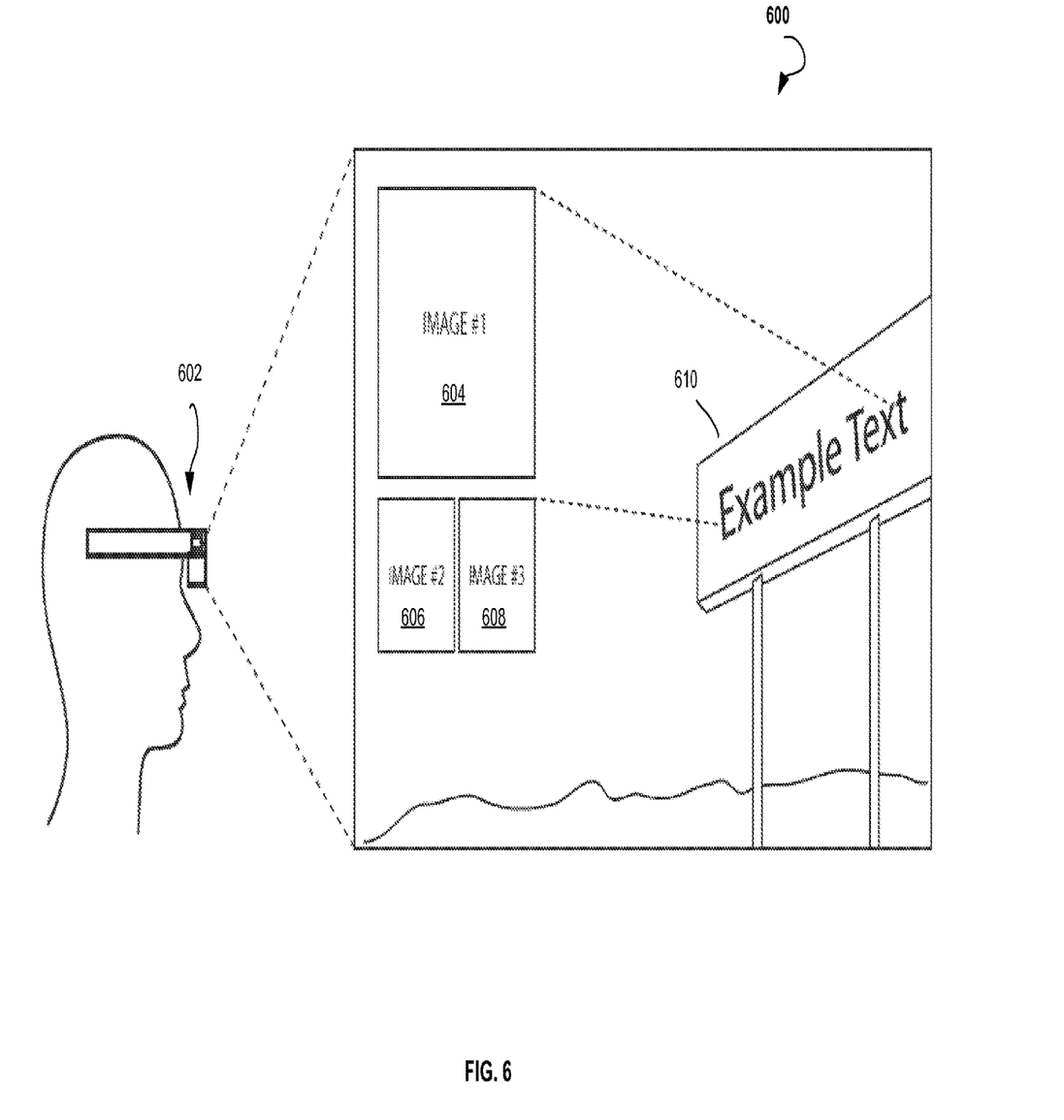
FIG. 6 is a block diagram illustrating the application of a head-mountable display device for optical character recognition of a text from a physical environment, in accordance with certain embodiments.

FIG. 6 is a block diagram illustrating application of a head-mountable display device for optical character recognition of a text from a physical environment, in accordance with certain embodiments. As shown in FIG. 6, a user wearing a head-mountable display device 602, with a built-in digital camera, may view a physical environment 610. The digital camera may scan the surroundings, such as advertisements, signs, billboards, magazines, newspapers and so forth, for text content. The text content may then be processed using optical character recognition module 270 to retrieve keywords and display relevant pieces of multimedia content, such as images 604, 606, and 608, on a display of the head-mountable display device 602.

Figure 7:
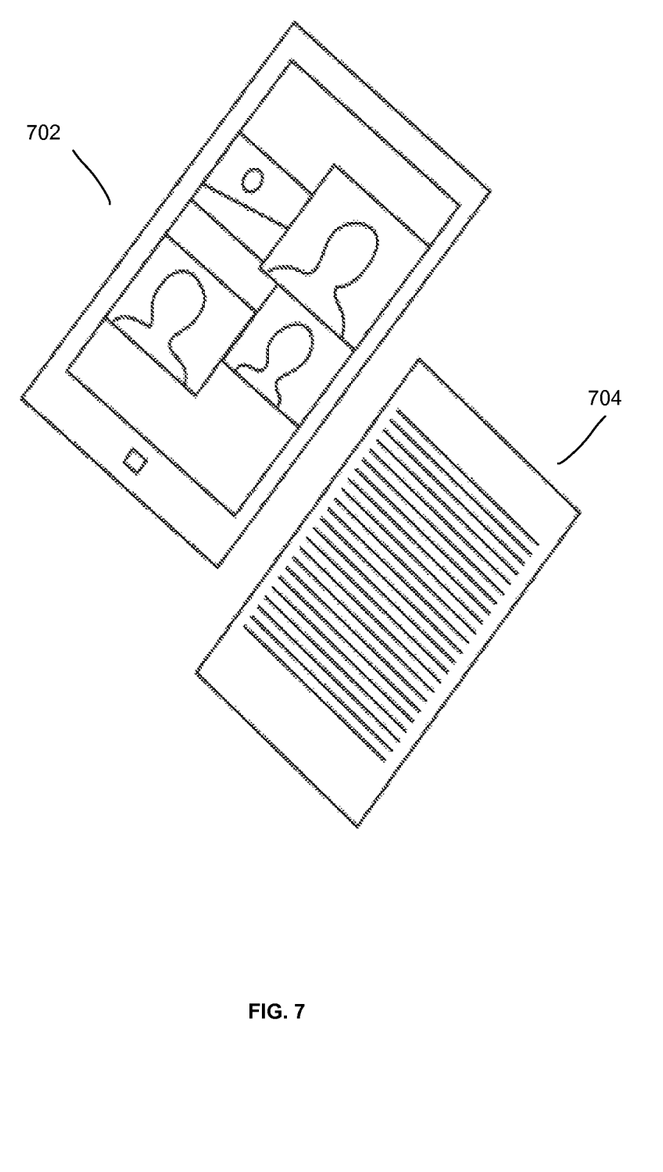
FIG. 7 is a block diagram illustrating the application of a tablet device for optical character recognition of a text from a text environment, in accordance with certain embodiments.

FIG. 7 is a block diagram illustrating the application of a tablet device for optical character recognition of a text from a text environment, in accordance with certain embodiments. As shown in FIG. 7, a tablet device 702 may be used to scan text environment 704. The text environment 704 may include any printed documents, newspapers, magazines and so forth. The text scanned from the text environment may then be processed using optical character recognition module 270 to retrieve keywords and display relevant pieces of multimedia content on the screen of the tablet device 702.

Figure 8:
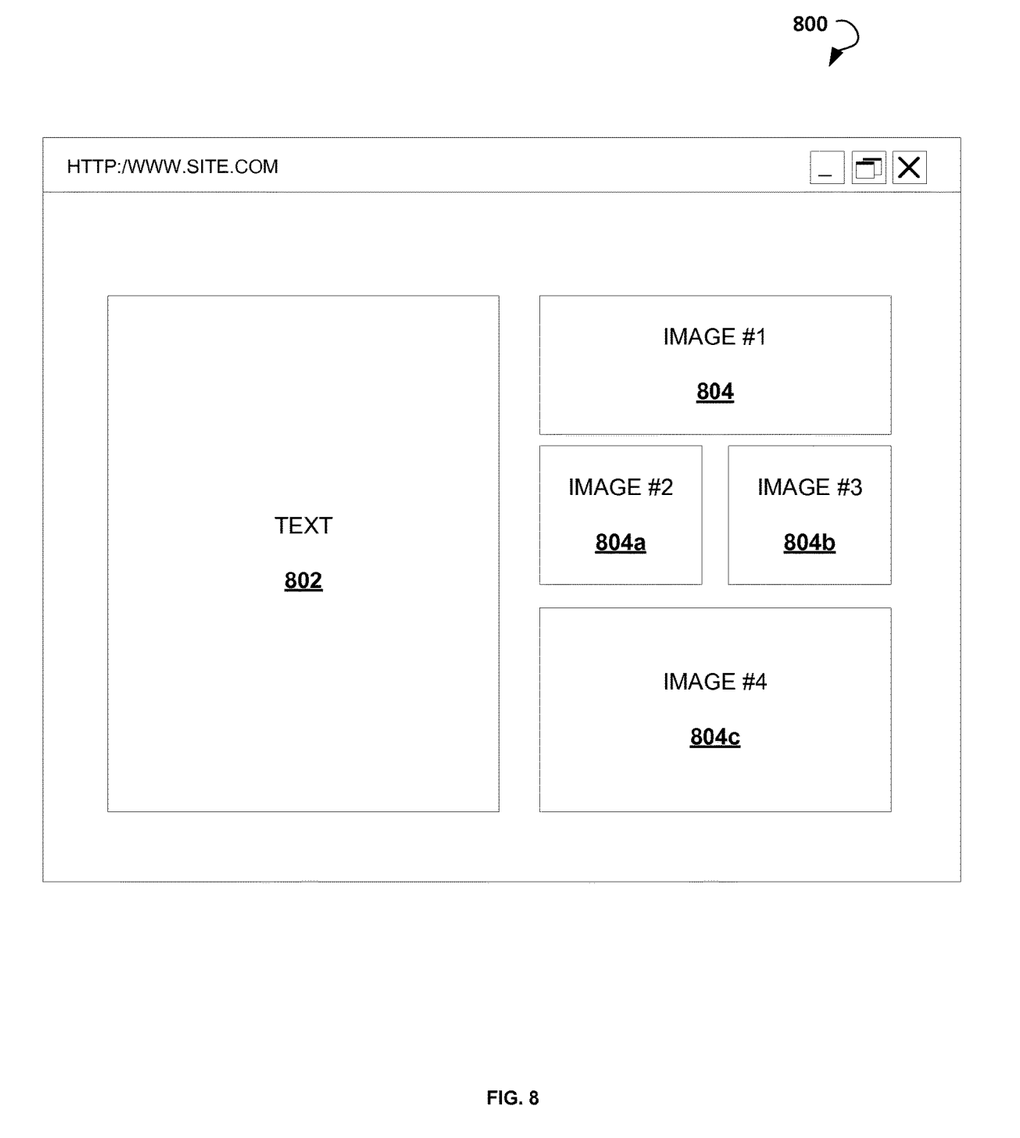
FIG. 8 is a graphical user interface of a user device displaying a text and the corresponding multimedia content within a browser, in accordance with certain embodiments.

FIG. 8 is a block diagram showing a user device 800 having a browser within which a text 802 and the corresponding images 804 are displayed in a grid-like fashion. The displayed portion of the text 802 is located within the left-hand section of the user device screen. To the right of the displayed portion of the text 802 four images are displayed. Two larger rectangular images 804, 804c are positioned, respectively, at the top and the bottom of the right-hand section of the user-device screen, while two smaller-sized square images 804a, 804b are positioned next to each other in the middle of the right-hand section of the user device screen.

Figure 9:
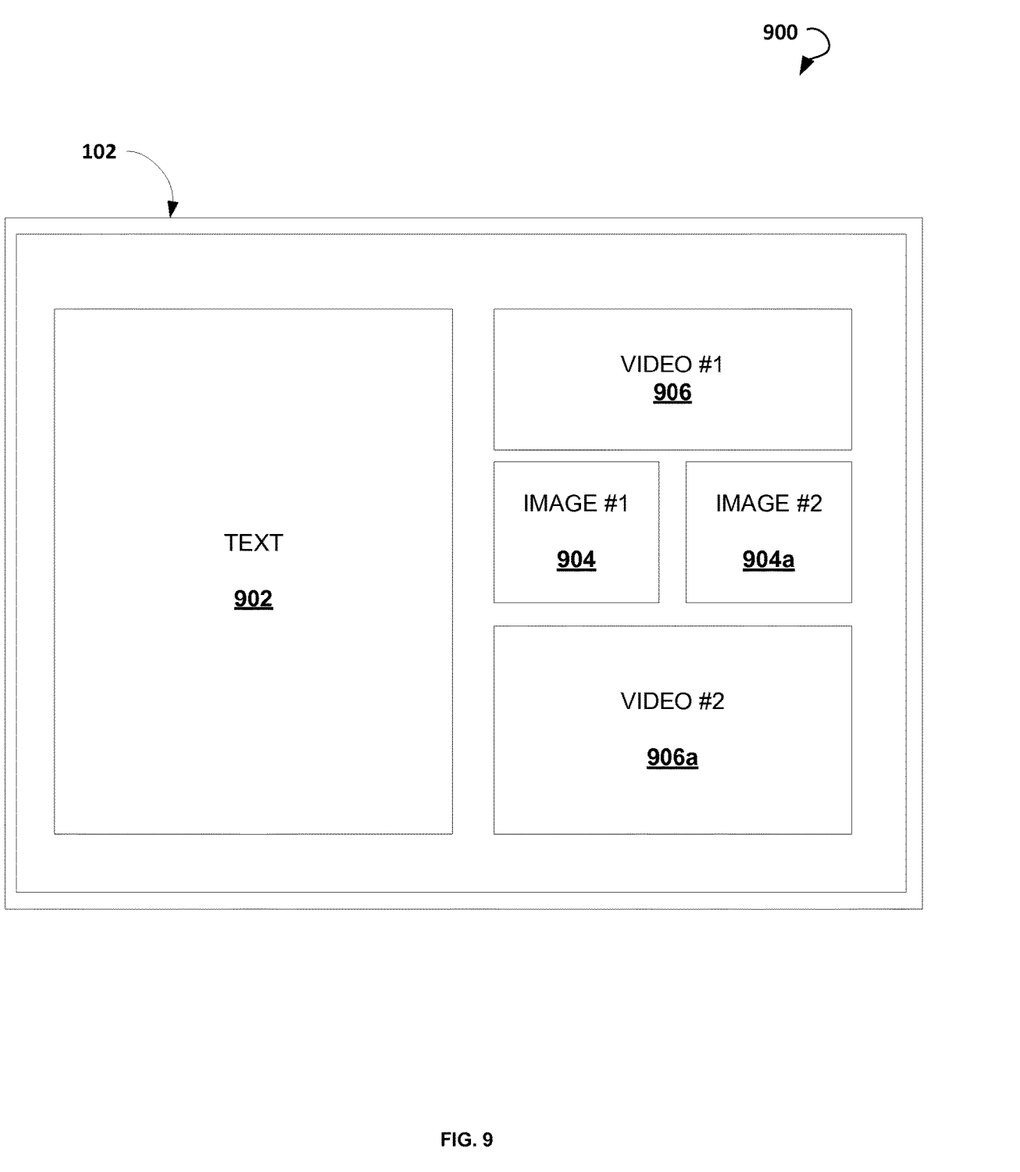
FIG. 9 is an illustration of a graphical user interface of a user device, displaying a text and the corresponding multimedia content within a mobile application, in accordance with certain embodiments.

FIG. 9 is a block diagram showing a graphical user interface of a user device 900, displaying a text 902 and the corresponding multimedia content (images 904, 904a and videos 906, 906a) adjacent to the text in a grid-like fashion. The displayed portion of the text 902 is located in the left-hand section of the user device screen. Adjacent to the displayed portion of the text 902 are two videos and two images. The videos 906, 906a are represented by larger-sized rectangular images and positioned, respectively, on top and at the bottom of the right-hand section of the user-device screen, while the images 904, 904a, which are smaller in size and square-shaped, are positioned next to each other in between the videos 906, 906a, in the middle of the right-hand section of the user device screen.

Figure 10:
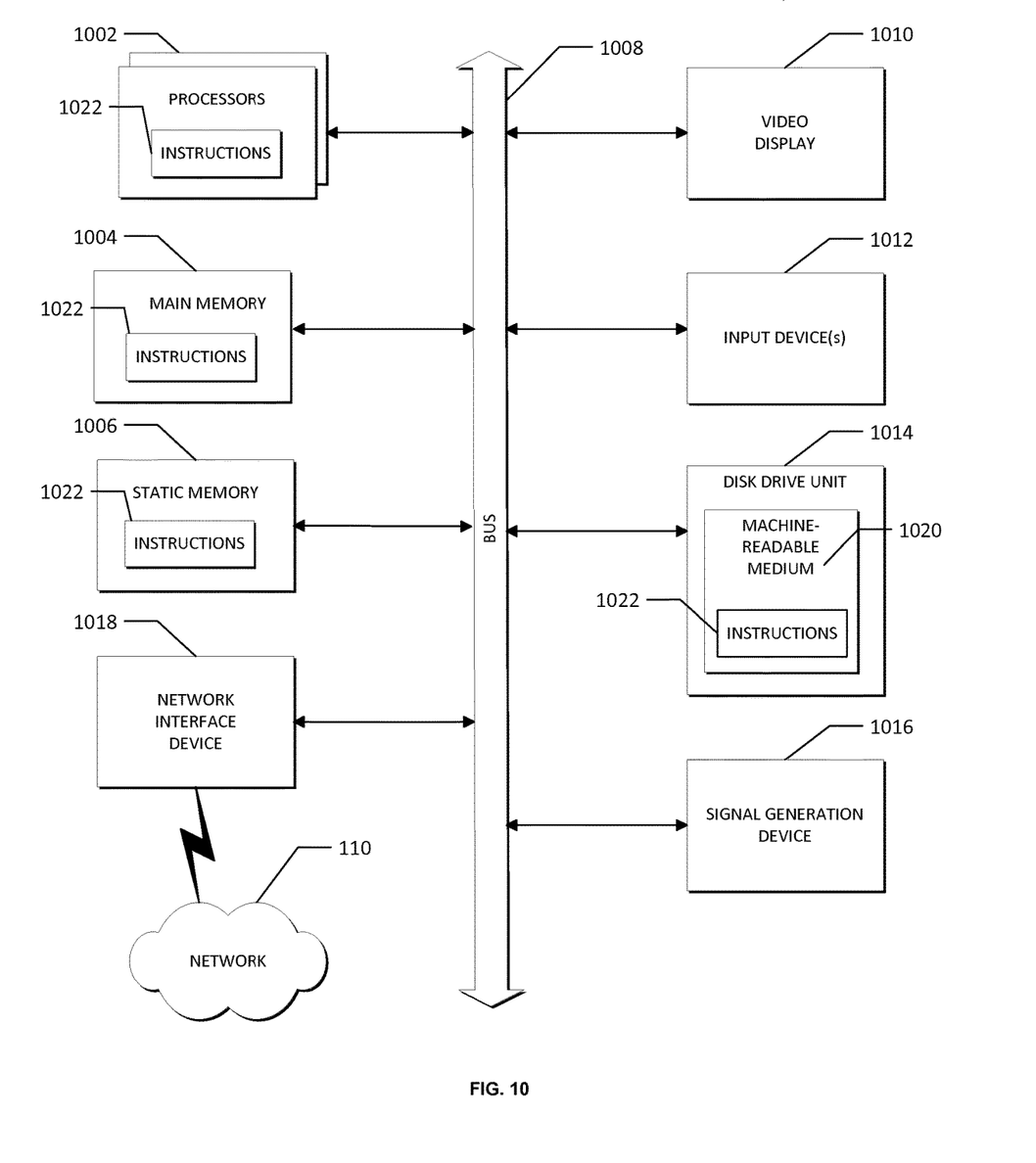
FIG. 10 is a diagrammatic representation of an example machine in the form of a computer system within which a set of instructions, for the machine to perform any one or more of the methodologies discussed herein, is executed.

FIG. 10 shows a diagrammatic representation of a computing device for a machine in the example electronic form of a computer system 1000, within which a set of instructions for causing the machine to perform any one or more of the methodologies discussed herein can be executed. In example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a PDA, a cellular telephone, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002 (e.g., a central processing unit (CPU), a graphics processing unit (GPU), or both), and a main memory 1004 and a static memory 1006, which communicate with each other via a bus 1008. The computer system 1000 may further include a video display unit 1010 (e.g., a liquid crystal display (LCD) or cathode ray tube (CRT)). The computer system 1000 may also include at least one input device 1012, such as an alphanumeric input device (e.g., a keyboard), a cursor control device (e.g., a mouse), a microphone, a digital camera, a video camera, and so forth. The computer system 1000 may also include a disk drive unit 1014, a signal generation device 1016 (e.g., a speaker), and a network interface device 1018.

The disk drive unit 1014 may include a computer-readable medium 1020 which may store one or more sets of instructions and data structures (e.g., instructions 1022) embodying or utilized by any one or more of the methodologies or functions described herein. The instructions 1022 may also reside, completely or at least partially, within the main memory 1004 and/or within the processors 1002 during execution thereof by the computer system 1000. The main memory 1004 and the processors 1002 may also constitute machine-readable media.

The instructions 1022 may further be transmitted or received over the network 110 via the network interface device 1018 utilizing any one of a number of well-known transfer protocols (e.g., Hyper Text Transfer Protocol (HTTP), CAN, Serial, and Modbus).

While the computer-readable medium 1020 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media may also include, without limitation, hard disks, floppy disks, flash memory cards, digital video disks, random access memory (RAM), read only memory (ROM), and the like.

The example embodiments described herein may be implemented in an operating environment comprising computer-executable instructions (e.g., software) installed on a computer, in hardware, or in a combination of software and hardware. The computer-executable instructions may be written in a computer programming language or can be embodied in firmware logic. If written in a programming language conforming to a recognized standard, such instructions may be executed on a variety of hardware platforms and for interfaces to a variety of operating systems. Although not limited thereto, computer software programs for implementing the present method may be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for automated augmentation of text, web and physical environments using multimedia content have been described. The disclosed technique provides a useful tool to enable people to easily purchase product items from multiple retailer websites within, for example, a social network, without leaving the website of the network.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method comprising:
scanning, with a digital camera of a user device, text visible to a user in an environment external to the user device;
parsing the scanned text to separate out non-text elements and to detect a format of the scanned text;
performing optical character recognition and context analysis on the parsed text to recognize shapes of individual characters in the parsed text and to generate words from the recognized characters;
outputting a text-searchable formatted output based on the detected format and the generated words;
identifying one or more keywords of the text from the text-searchable formatted output based on the one or more keywords satisfying a relevance criteria;
performing a first search in a data storage for multimedia content relevant to the one or more keywords using the one or more keywords as search terms;
retrieving the multimedia content relevant to the one or more keywords from the data storage;
receiving first user input to delete at least one item of the multimedia content for the first search;
receiving second user input to select at least one remaining item of the multimedia content for the first search;
in response to the retrieval of the multimedia content and the first and second user input, presenting the multimedia content including the at least one remaining item to the user adjacent to the text; and
in response to subsequently performing a second search that is similar to the first search, retrieving the selected at least one remaining item without retrieving the deleted at least one item.

2. The method of claim 1, wherein the digital camera is attached to a head-mountable display device and wherein presenting the multimedia content to the user comprises displaying the multimedia content on the head-mountable display device arranged beside the text in a field of view of the user.

3. The method of claim 1, wherein the digital camera is attached to a display device and wherein presenting the multimedia content to the user comprises displaying the multimedia content on the display device.

4. The method of claim 1, wherein the satisfaction of the relevance criteria is based on contextual data associated with the text, the contextual data including one or more of: a location, a date, and a name.

5. The method of claim 4, wherein the contextual data includes a date from the text and the date is used as a search parameter in searching for the multimedia content.

6. The method of claim 1, wherein performing the first search for the multimedia content comprises searching for a sentence identified in the text.

7. The method of claim 6, wherein the sentence is identified based on the sentence including a location, a date and a name.

8. The method of claim 1, wherein the one or more keywords are identified based on terms that occur frequently in the text.

9. The method of claim 8, wherein the terms are nouns.

10. The method of claim 1, wherein presenting the multimedia content includes simultaneously presenting two or more of: an image, a video, and audio.

11. The method of claim 1, further comprising:
associating the multimedia content with the text based on the multimedia content being relevant to the one or more keywords and the keywords satisfying the relevance criteria relative to the text; and
sharing the text and the associated multimedia content via social media.

* * * * *

UNITED STATES PATENT AND TRADEMARK OFFICE
CERTIFICATE OF CORRECTION

PATENT NO. : 11,256,848 B2
APPLICATION NO. : 16/551508
DATED : February 22, 2022
INVENTOR(S) : Ahmed Salama It is certified that error appears in the above-identified patent and that said Letters Patent is hereby corrected as shown below:

In the Specification

Column 4, Lines 20-21, replace "a computer-implemented methods" with -- computer-implemented methods --.

Column 6, Line 8, replace "which may be include" with -- which may include --.

Column 6, Line 49, replace "may reveal the link or opens up" with -- may reveal the link or open up --.

Column 8, Line 5, replace ", etc." with -- , etc.). --.

Column 9, Line 14, replace "or the in" with -- or in --.

Column 11, Line 7, replace "scanning text associated text" with -- scanning text associated with text --.

Signed and Sealed this
Fifteenth Day of November, 2022

Katherine Kelly Vidal
*Director of the United States Patent and Trademark Office*